United States Patent
Hansen et al.

(10) Patent No.: US 7,795,549 B2
(45) Date of Patent: Sep. 14, 2010

(54) WEIGHT INDICATOR HOUSING WITH A TOP AND BOTTOM COVER ATTACHABLE TOGETHER IN MORE THAN ONE CONFIGURATION

(75) Inventors: Robert Hansen, Succasunna, NJ (US); Douglas Gardner, Dumont, NJ (US); Zbigniew Pobocha, Brookside, NJ (US)

(73) Assignee: Ohaus Corporation, Pine Brook, NJ (US)

( * ) Notice: Subject to any disclaimer, the term of this patent is extended or adjusted under 35 U.S.C. 154(b) by 632 days.

(21) Appl. No.: 11/731,807

(22) Filed: Mar. 31, 2007

(65) Prior Publication Data

US 2009/0166096 A1    Jul. 2, 2009

(51) Int. Cl.
*G01G 21/28* (2006.01)
*G01G 23/18* (2006.01)

(52) U.S. Cl. .............. 177/238; 174/5; 174/520; 361/679.06; 361/730; 361/752

(58) Field of Classification Search .............. 361/679.4, 361/679.06, 752, 730; 174/520, 50; 177/238–244, 177/177, 178
See application file for complete search history.

(56) References Cited

U.S. PATENT DOCUMENTS

| | | | | |
|---|---|---|---|---|
| 3,941,951 A | * | 3/1976 | Engstrom et al. | 379/436 |
| 4,084,214 A | * | 4/1978 | Eppich | 361/679.08 |
| 4,364,442 A | * | 12/1982 | Flickinger | 177/177 |
| 4,652,969 A | * | 3/1987 | Stegenga | 361/694 |
| 4,989,167 A | * | 1/1991 | Kapec et al. | 361/679.08 |
| 5,072,330 A | * | 12/1991 | Fuqua | 361/679.01 |
| 5,111,362 A | * | 5/1992 | Flamm et al. | 361/736 |
| 5,257,164 A | * | 10/1993 | Perez et al. | 361/679.22 |
| 5,376,934 A | * | 12/1994 | Savazzi | 341/22 |
| 5,566,424 A | * | 10/1996 | Crompton et al. | 16/342 |
| 6,013,878 A | * | 1/2000 | Schwartz et al. | 177/25.13 |
| 6,366,454 B1 | * | 4/2002 | Rapaich et al. | 361/679.08 |
| 6,700,080 B2 | * | 3/2004 | Stephens | 177/126 |
| 6,844,507 B2 | * | 1/2005 | Leisinger et al. | 177/180 |
| 7,002,084 B2 | * | 2/2006 | Cox et al. | 177/238 |
| 7,016,182 B2 | * | 3/2006 | Brandenberg et al. | 361/679.06 |
| 7,076,325 B1 | * | 7/2006 | Rapaich et al. | 700/213 |
| 7,397,003 B2 | * | 7/2008 | Cox et al. | 177/238 |
| 7,423,226 B2 | * | 9/2008 | Rotach et al. | 177/180 |
| 7,567,431 B2 | * | 7/2009 | Brooks et al. | 361/679.06 |
| 2008/0186689 A1 | * | 8/2008 | Koizumi | 361/752 |

* cited by examiner

*Primary Examiner*—Randy W Gibson
(74) *Attorney, Agent, or Firm*—Standley Law Group LLP

(57) ABSTRACT

A housing for a weighing indicator terminal, having a top cover and a base member attached to the top cover. The top cover and the base member have complimentary configurations whereby the top cover and the base member are attachable together in more than one configuration.

19 Claims, 4 Drawing Sheets

WEIGHT INDICATOR HOUSING WITH A TOP AND BOTTOM COVER ATTACHABLE TOGETHER IN MORE THAN ONE CONFIGURATION

BACKGROUND OF THE INVENTION

The present invention relates to scales and weighing devices, and more particularly to a reversible housing for a weighing indicator, a weighing indicator, and a bench scale having a weighing indicator with such a housing.

Bench scales are known in the art and typically have three basic components, namely a weighing indicator terminal, an indicator attachment and a platform. Due to differences in application, scale placement and usage, the indicator attachment must change which causes the indicator cabling locations to differ. This creates a problem for users who must purchase different indicator attachments depending on the application, scale placement or usage.

SUMMARY OF THE INVENTION

Accordingly, it is an object of the present invention to provide a housing for a weighing indicator/terminal which overcomes the problems of the prior art by allowing a single indicator terminal to be used in different scale applications, scale placements and usages.

Pursuant to this object, and others which will become apparent hereafter, one aspect of the present invention resides in a housing for a weighing indicator terminal. The housing has a top cover and a base member attached to the top cover. The top cover and the base member have complimentary configurations whereby the top cover and the base member are attachable together in more than one configuration.

In another embodiment the top cover has an upper wall, a front wall and a rear wall. The front and rear wall project from the upper wall to different extents so that the upper wall slopes downwardly from the rear wall to the front wall.

The base member has a first wall, a second wall and a bottom wall that extends between the first and second walls. Cable connectors are mounted in the second wall. In a preferred embodiment the second wall is higher than the first wall.

In one embodiment the top cover is attached to the base member so that the front wall of the top cover abuts the second wall of the base member and the rear wall of the top cover abuts the first wall of the base member, whereby the upper wall of the top cover is substantially parallel to the bottom wall of the base member.

In another embodiment the top cover is attached to the base member so that the front wall of the top cover abuts the first wall of the base member and the rear wall of the top cover abuts the second wall of the base member, whereby the upper wall of the top cover is at an angle to the bottom wall of the base member.

A display and a keypad are arranged in the upper wall of the top cover for use and operation of the indicator terminal.

The base member has lateral walls that extend between the first wall and the second wall. Mounting elements (such as knobs) are attached to the lateral walls of the base member to facilitate mounting of the housing to a scale platform.

In yet a further embodiment the top cover is selectively attachable to the base member in two orientations. In the first orientation the top cover is attached to the base member so that the front wall of the top cover abuts the second wall of the base member and the rear wall of the top cover abuts the first wall of the base member, whereby the upper wall of the top cover is substantially parallel to the bottom wall of the base member. In the second orientation the top cover is attached to the base member so that the front wall of the top cover abuts the first wall of the base member and the rear wall of the top cover abuts the second wall of the base member, whereby the upper wall of the top cover is at an angle to the bottom wall of the base member.

Another aspect of the invention resides in a scale having a scale platform, an indicator terminal having a housing with a top cover, and a base member attached to the top cover, the top cover and the base member having complimentary configurations whereby the top cover and the base member are attachable together in more than one configuration, and an attachment member connecting the indicator terminal to the scale platform.

Further advantages, features and details of the invention are revealed in the following description of preferred exemplified embodiments and with the aid of the drawings.

DESCRIPTION OF THE INVENTION

Figure 1:
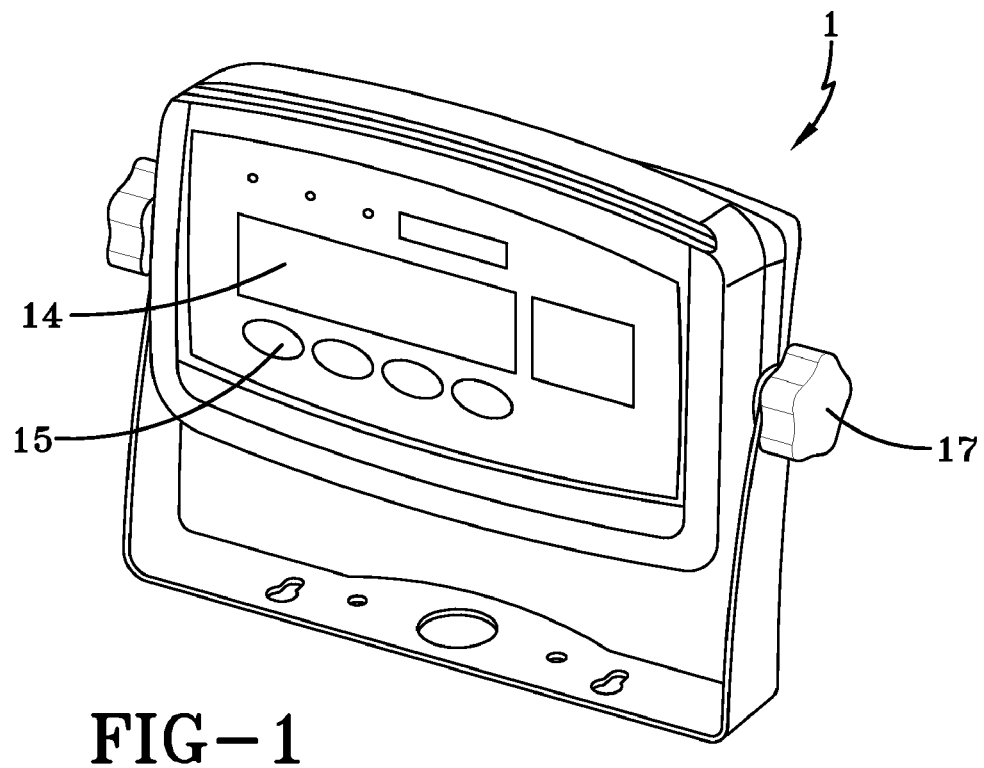
FIG. 1 shows the inventive weighing indicator terminal housing.
Figure 2:
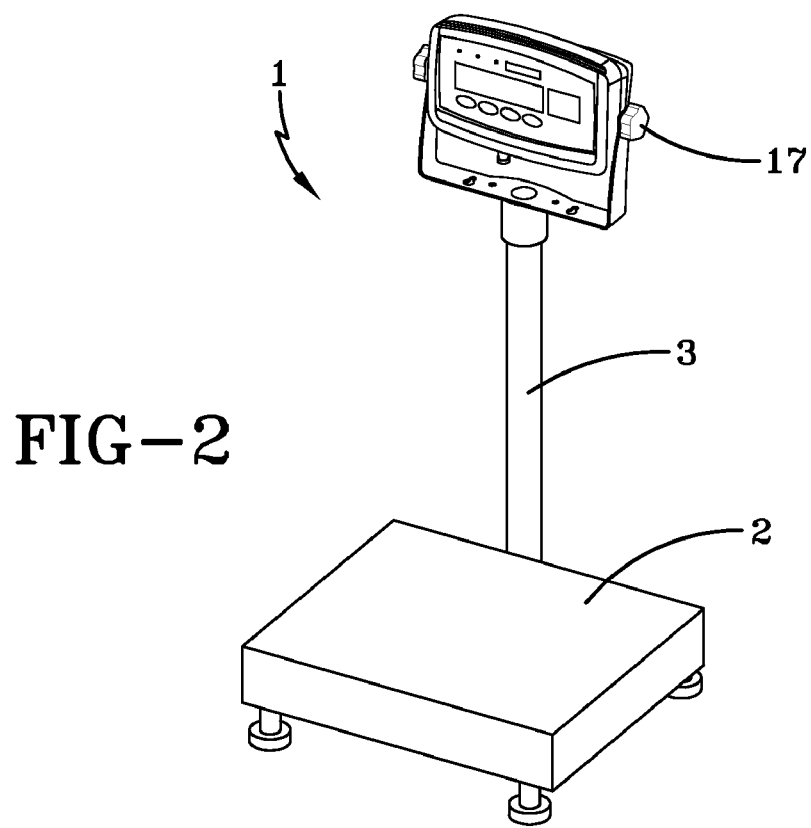
FIG. 2 shows a bench scale with the indicator terminal.

FIG. 1 shows the weighing indicator terminal 1 having a housing pursuant to the present invention. FIG. 2 shows a bench scale with the indicator terminal 1 mounted to a scale platform 2 by an attachment member 3.

Figure 3:
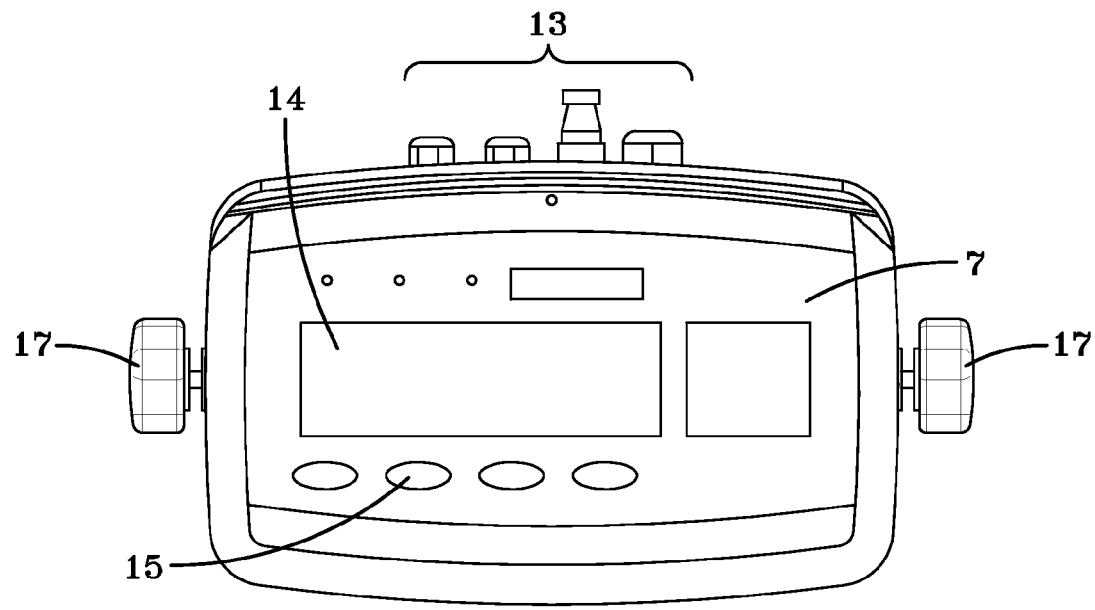
FIG. 3 shows a front view of the indicator in a desktop configuration.
Figure 4:
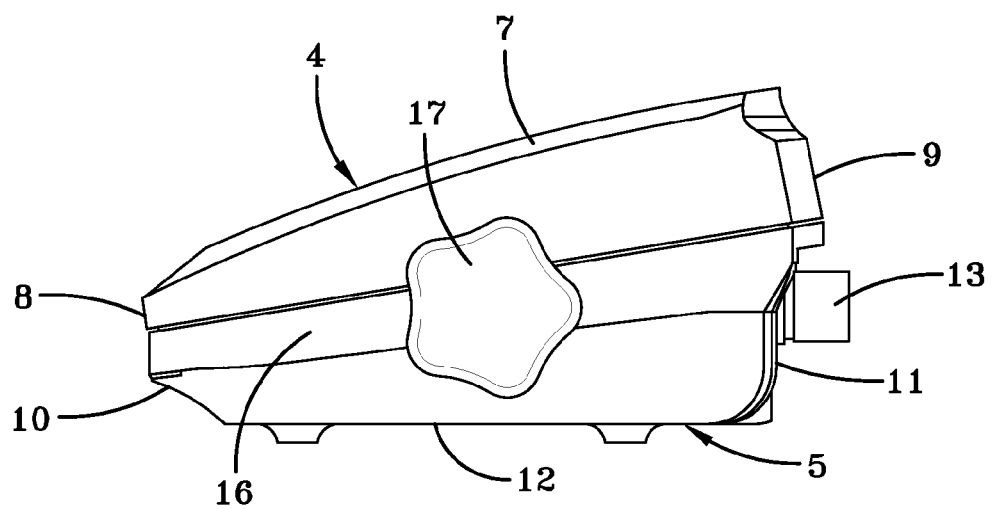
FIG. 4 is a side view of FIG. 3.

The housing of the indicator terminal 1 has a top cover 4 and a base member 5 attached to the top cover 4 by fasteners 6. The fasteners can be snaps, clips, screws, rivets, adhesive or any other means for holding the top cover 4 and the base member 5 together. The top cover 4 and the base member 5 have complimentary configurations whereby the top cover 4 and the base member 5 are attachable together in more than one configuration. As shown in FIGS. 3 and 4, the top cover 4 and the base member 5 are in a desktop configuration, while in FIGS. 5 and 6 the top cover 4 and base member 5 are in a wall mount configuration.

The top cover 4 has an upper wall 7, a front wall 8 and a rear wall 9. The front and rear walls project from the upper wall 7 to different extents so that the upper wall slopes downwardly from the rear wall 9 to the front wall 8.

Figure 6:
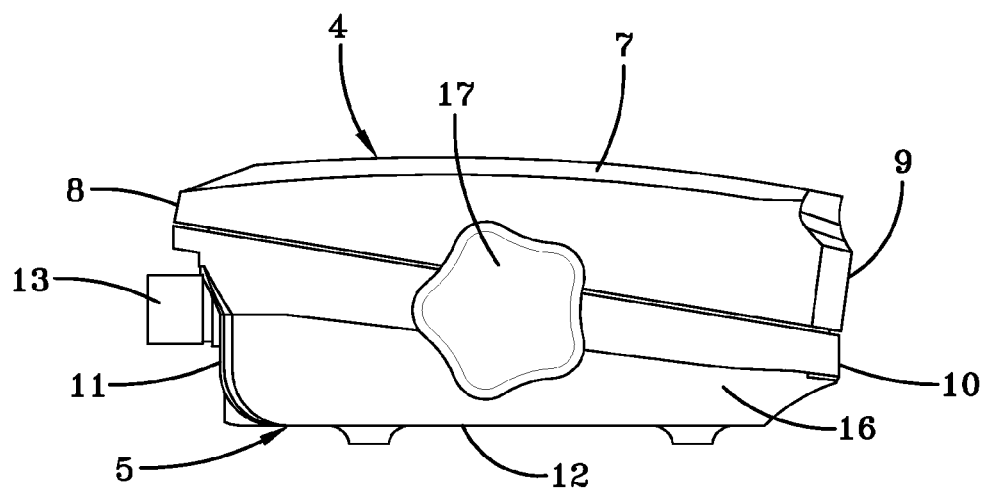
FIG. 6 is a side view of FIG. 5.
Figure 7:
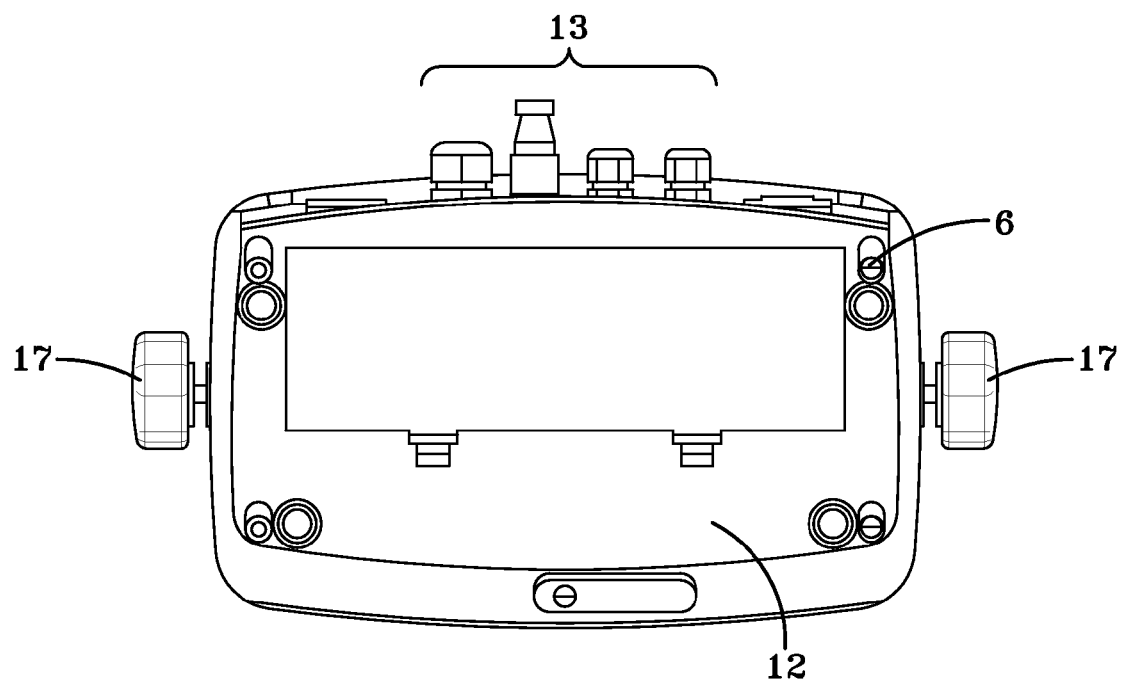
FIG. 7 is a bottom view of the indicator terminal.

The base member 5 has a first wall 10, a second wall 11 and a bottom wall 12 that extends between the first and second walls. The second wall has cable connectors 13 mounted therein. As shown in FIGS. 4 and 6, the second wall 11 is higher than the first wall 10.

Figure 5:
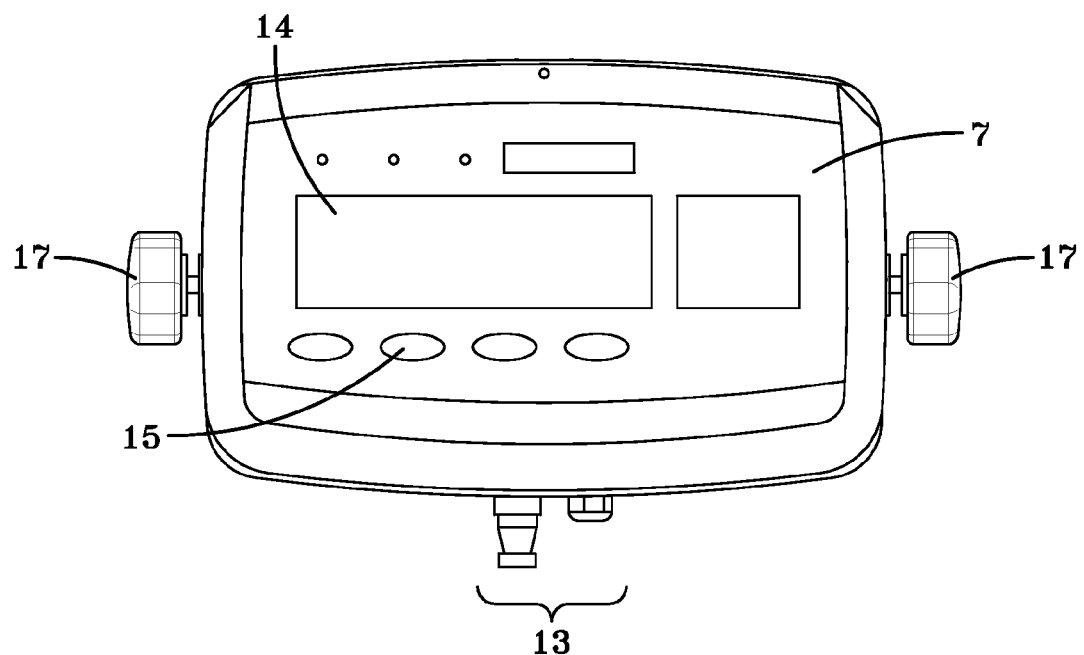
FIG. 5 shows a front view of the indicator terminal in a wall mounting configuration.

In FIGS. 5 and 6, the top cover 4 is attached to the base member 5 so that the front wall 8 of the top cover 4 abuts the second wall 11 of the base member 5 and the rear wall 9 of the top cover 4 abuts the first wall 10 of the base member 5. As a result of this configuration the upper wall 7 of the top cover 4 is substantially parallel to the bottom wall 12 of the base member 5.

In FIGS. 3 and 4, the top cover 4 is attached to the base member 5 so that the front wall 8 of the top cover 4 abuts the first wall 10 of the base member 5 and the rear wall 9 of the top cover 4 abuts the second wall 11 of the base member 5. As a result of this configuration the upper wall 7 of the top cover 4 is at an angle to the bottom wall 12 of the base member 5.

From the illustrated embodiments it is apparent that the housing can be assembled and reassembled using the two main components to provide different configurations as need at a final use location.

A display 14 and a keypad 15 are arranged in the upper wall 7 of the top cover 4.

The base member 5 has lateral walls 16 that extend between the first wall 10 and the second wall 11. Mounting elements 17, such as knobs, are attached to the lateral walls 16 of the base member 5 to facilitate mounting of the terminal 1 to the attachment member 3 and the scale platform 2.

The inventive housing construction allows all the necessary indicator terminal cabling attachments to be rotated relative to the display/keypad of the indicator terminal. This permits unique flexibility in attachment and usage, for example allowing the same housing to be mounted on a desktop/table, a wall or a post.

Although the present invention has been described in relation to particular embodiments thereof, many other variations and modifications and other uses will be apparent to those skilled in the art. Therefore, the present invention is not limited by the specific disclosure herein, but only by the appended claims.

The invention claimed is:

1. A housing for a weighing indicator terminal, comprising:
    a weighing indicator terminal top cover including an upper wall, a front wall and a rear wall, the front and rear walls projecting from the upper wall to different extents so that the upper wall slopes downwardly from the rear wall to the front wall;
    a weighing indicator terminal base member attached to the top cover, the top cover and the base member having complimentary configurations; and
    mounting elements attached to the base member that facilitate mounting of the housing to a scale member,
        whereby in a first configuration the top cover and the base member are attached to facilitate viewing of the housing for a weighing indicator terminal when in a substantially vertical orientation, and
        whereby in a second configuration the top cover and base member are attached to facilitate viewing of the housing for a weighing indicator terminal when in a substantially horizontal orientation.

2. The housing according to claim 1, wherein the base member has a first wall, a second wall and a bottom wall that extends between the first and second walls, the second wall having cable connectors mounted therein.

3. The housing according to claim 2, wherein the second wall is higher than the first wall.

4. The housing according to claim 3, wherein the top cover is attached to the base member so that the front wall of the top cover abuts the second wall of the base member and the rear wall of the top cover abuts the first wall of the base member, whereby the upper wall of the top cover is substantially parallel to the bottom wall of the base member.

5. The housing according to claim 3, wherein the top cover is attached to the base member so that the front wall of the top cover abuts the first wall of the base member and the rear wall of the top cover abuts the second wall of the base member, whereby the upper wall of the top cover is at an angle to the bottom wall of the base member.

6. The housing according to claim 1, further comprising a display of a weighing indicator terminal arranged in the upper wall of the top cover.

7. The housing according to claim 1, further comprising a keypad of a weighing indicator terminal arranged in the upper wall of the top cover.

8. The housing according to claim 2, wherein the base member has lateral walls that extend between the first wall and the second wall.

9. The housing according to claim 8, wherein the mounting elements attach to the lateral walls of the base member to facilitate mounting of the housing to a scale member.

10. The housing according to claim 3, wherein the top cover is selectively attachable to the base member in a first orientation in which the top cover is attached to the base member so that the front wall of the top cover abuts the second wall of the base member and the rear wall of the top cover abuts the first wall of the base member, whereby the upper wall of the top cover is substantially parallel to the bottom wall of the base member, and a second orientation in which the top cover is attached to the base member so that the front wall of the top cover abuts the first wall of the base member and the rear wall of the top cover abuts the second wall of the base member, whereby the upper wall of the top cover is at an angle to the bottom wall of the base member.

11. The weighing indicator terminal according to claim 1, wherein the base member includes at least one pair of mounting feet engaged with the bottom wall.

12. The housing according to claim 1, further comprising a substantially C-shaped bracket rotatably secured to the housing by the mounting elements and adapted to mount the housing to the scale member.

13. A housing for a weighing indicator terminal, comprising:
    a weighing indicator terminal top cover including an upper wall, a front wall and a rear wall, the front and rear walls projecting from the upper wall to different extents so that the upper wall slopes downwardly from the rear wall to the front wall;
    a weighing indicator terminal base member attached to the top cover, the top cover and the base member having complimentary configurations, the base member including a first wall, a second wall and a bottom wall that extends between the first and second walls, lateral walls of the base member extending between the first wall and the second wall, the second wall being higher than the first wall, and having cable connectors mounted therein; and
    mounting elements attached to the lateral walls of the base member that facilitate mounting of the housing to a scale member,
        whereby in a first configuration the top cover and the base member are attached to facilitate viewing of the weighing indicator terminal when mounted in a substantially vertical orientation on the scale member, and
        whereby in a second configuration the top cover and base member are attached to facilitate viewing of the weighing indicator terminal when in a substantially horizontal orientation.

14. The housing for a weighing indicator terminal according to claim 13, wherein the top cover is attached to the base member so that the front wall of the top cover abuts the second wall of the base member and the rear wall of the top cover abuts the first wall of the base member, whereby the upper wall of the top cover is substantially parallel to the bottom wall of the base member.

15. The housing for a weighing indicator terminal according to claim 13, wherein the top cover is attached to the base member so that the front wall of the top cover abuts the first wall of the base member and the rear wall of the top cover abuts the second wall of the base member, whereby the upper wall of the top cover is at an angle to the bottom wall of the base member.

16. The housing for a weighing indicator terminal according to claim 13, further comprising a display of a weighing indicator terminal arranged in the upper wall of the top cover.

17. The housing for a weighing indicator terminal according to claim 13, further comprising a keypad of a weighing terminal arranged in the upper wall of the top cover.

18. The housing for a weighing indicator terminal according to claim 13, wherein the top cover is selectively attachable to the base member in a first orientation in which the top cover is attached to the base member so that the front wall of the top cover abuts the second wall of the base member and the rear wall of the top cover abuts the first wall of the base member, whereby the upper wall of the top cover is substantially parallel to the bottom wall of the base member, and a second orientation in which the top cover is attached to the base member so that the front wall of the top cover abuts the first wall of the base member and the rear wall of the top cover abuts the second wall of the base member, whereby the upper wall of the top cover is at an angle to the bottom wall of the base member.

19. A weighing indicator terminal, comprising:
  a housing further comprising:
    a weighing indicator terminal top cover including an upper wall, a front wall and a rear wall, the front and rear walls projecting from the upper wall to different extents so that the upper wall slopes downwardly from the rear wall to the front wall, and
    a weighing indicator terminal base member including a first wall, a second wall and a bottom wall that extends between the first and second walls, lateral walls of the base member extending between the first wall and the second wall, the second wall being higher than the first wall, and having cable connectors mounted therein,
  mounting elements attached to the base member that facilitate mounting of the housing to a scale member;
  a substantially C-shaped bracket rotatably secured to the housing by the mounting elements and adapted to mount the weighing indicator terminal to the scale member;
  a display arranged in the upper wall of the top cover; and
  a keypad arranged in the upper wall of the top cover,
  wherein the top cover is selectively attachable to the base member;
  whereby in a first orientation to facilitate viewing of the weighing indicator terminal when mounted in a substantially vertical orientation on a scale member, the top cover is attached to the base member so that the front wall of the top cover abuts the second wall of the base member and the rear wall of the top cover abuts the first wall of the base member, whereby the upper wall of the top cover is substantially parallel to the bottom wall of the base member, and
  whereby in a second orientation to facilitate viewing of the weighing indicator terminal when in a substantially horizontal orientation, the top cover is attached to the base member so that the front wall of the top cover abuts the first wall of the base member and the rear wall of the top cover abuts the second wall of the base member, whereby the upper wall of the top cover is at an angle to the bottom wall of the base member.

* * * * *